(12) United States Patent
Hsu et al.

(10) Patent No.: US 10,003,727 B1
(45) Date of Patent: Jun. 19, 2018

(54) CAMERA MODULE CAPABLE OF EMITTING A UNIFORM LIGHT

(71) Applicant: Cheng Uei Precision Industry Co., Ltd., New Taipei (TW)

(72) Inventors: Yu Min Hsu, New Taipei (TW); Chih Yuan Huang, New Taipei (TW); I Hsiang Lo, New Taipei (TW); Hou Ming Huang, New Taipei (TW); Yung En Chu, New Taipei (TW)

(73) Assignee: Cheng Uei Precision Industry Co., Ltd., New Taipei (TW)

( * ) Notice: Subject to any disclaimer, the term of this patent is extended or adjusted under 35 U.S.C. 154(b) by 0 days. days.

(21) Appl. No.: 15/369,937

(22) Filed: Dec. 6, 2016

(51) Int. Cl.
*H04N 5/225* (2006.01)
*H04N 5/33* (2006.01)
*G02B 27/09* (2006.01)

(52) U.S. Cl.
CPC ....... *H04N 5/2256* (2013.01); *G02B 27/0916* (2013.01); *G02B 27/0955* (2013.01); *H04N 5/2252* (2013.01); *H04N 5/2253* (2013.01); *H04N 5/332* (2013.01)

(58) Field of Classification Search
CPC .. H04N 5/2256; H04N 5/2252; H04N 5/2253; H04N 5/332; G02B 27/0916; G02B 27/0955
See application file for complete search history.

(56) References Cited

U.S. PATENT DOCUMENTS

| | | | |
|---|---|---|---|
| 2009/0195678 A1* | 8/2009 | Zhao | G03B 17/12 348/273 |
| 2012/0014115 A1* | 1/2012 | Park | G02B 27/0955 362/311.02 |
| 2014/0110485 A1* | 4/2014 | Toa | G06K 7/10821 235/462.21 |
| 2016/0044271 A1* | 2/2016 | Altman | H04N 5/4403 348/734 |
| 2016/0254410 A1* | 9/2016 | Mirhosseini-Schubert | H01L 33/08 348/371 |

\* cited by examiner

*Primary Examiner* — Amy Hsu
(74) *Attorney, Agent, or Firm* — Lin & Associates Intellectual Property, Inc.

(57) ABSTRACT

A camera module includes a camera, a light emitting unit, a circuit board. The camera is mounted on the circuit board and having an optical axis. The light emitting unit is disposed on the circuit board which emits a light beam forming a batwing-shaped luminous intensity distribution. The batwing-shaped luminous intensity distribution has at least two peaks of maximum luminous intensity. The optical axis of the camera is arranged at a position between the at least two peaks of the batwing-shaped luminous intensity distribution. The camera module emits a uniform light for enhancing authenticity of the image and increasing the reliability of the recognition system.

12 Claims, 5 Drawing Sheets

CAMERA MODULE CAPABLE OF EMITTING A UNIFORM LIGHT

BACKGROUND OF THE INVENTION

1. Field of the Invention

The present invention generally relates to a camera module which is applied in a face recognition field, and more particularly, the camera module is capable of emitting a uniform light.

2. The Related Art

With the evolution of the technology, the electronic commerce has replaced the traditional commerce. Therefore, the personal information security becomes more and more important, and the personal authentication way should not be just limited to the way of the traditionally literal password, but needs a tighter way for improving security, such as the biological recognition technology. The biological recognition technology refers to identity recognition by user's physiological characteristics, and it is widely used in the facility or personal device for user authentication. Generally speaking, because the face recognition technology possesses the advantages of the high convenience and the high efficiency, it becomes the one of the most popular biological recognition technologies.

The traditional face recognition system usually captures the relative location of the facial features in the 2D plane to identify and analyze, but this way can be deceived by using a digital image or a video frame, and easy to be influenced by the environmental light conditions. As above described, it has some risks for protecting the important data. Therefore, some researchers have developed the 3D face recognition system which can show the depth of the facial features and then effectively avoid using the image to deceive the system and reduce the influence of environmental factors on the system.

The latest 3D face recognition technology adopts the infrared detection, it generally comprises two infrared light-emitting diodes (IR LED) as supplementary lighting source and an infrared camera is positioned at the center between two IR LEDs. The IR LED emits the infrared light to the object, and the infrared camera captures the reflected infrared light to analyze the information, and then calculates the relative distance and depth of the features of the object. However, the IR luminous intensity emitted from the general IR LED is easy to concentrate in a direction perpendicular to the IR LED, hence the distribution of the luminous intensity is non-uniform and the circumferential luminous intensity is attenuate. The luminous intensity of the centered region of the captured image by the IR camera has greater luminous intensity than the circumferential region of the captured image, which makes the captured image different from the real object. As a result, it needs more subsequent processes in the circumferential region of the captured image, but the more processes the captured image does, the more difference the captured image and the real object have. The accuracy of the face recognition system is therefore reduced.

Therefore, there is a need to provide a camera module which can emit a uniform light for enhancing authenticity of the image and increasing the reliability of the recognition system.

SUMMARY OF THE INVENTION

An object of the present invention is to provide a camera module which can emit a uniform light for enhancing authenticity of the image and increasing the reliability of the recognition system. The camera module includes a camera, a light emitting unit, a circuit board. The camera has an optical axis. The light emitting unit has an optical axis and emits light forming a batwing-shaped luminous intensity distribution, wherein the batwing-shaped luminous intensity distribution has two maximum luminous intensity values positioned as two peaks. The circuit board holds the camera and the light emitting unit and wherein the optical axis of the camera is arranged ata position between two peaks of the batwing-shaped luminous intensity distribution.

Another object of the present invention is to provide a camera module, wherein includes a camera, a light emitting diode, and a circuit board. The light emitting diode is capable of emitting a batwing-shaped luminous intensity distribution, wherein the luminous intensity along a direction at a significant angle relative to an optical axis of the light emitting diode is greater than the luminous intensity along a direction parallel to the optical axis of the light emitting diode. The curve of the batwing-shaped luminous intensity distribution is provided with two peaks of maximum luminous intensity values positioned at deviating about 25 to 35 degrees from the optical axis of the light emitting unit. The camera is arranged between the two peaks of the batwing-shaped luminous intensity distribution for capturing the reflected light from the object. The light emitting diode is capable of emitting the uniform light for enhancing authenticity of the image and increasing the reliability of the recognition system.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

The following detailed description is merely exemplary in nature and is not intended to limit the applications and uses disclosed herein. Further, there is no intention to be bound by any theory presented in the preceding background or summary or the following detailed description.

Figure 1:
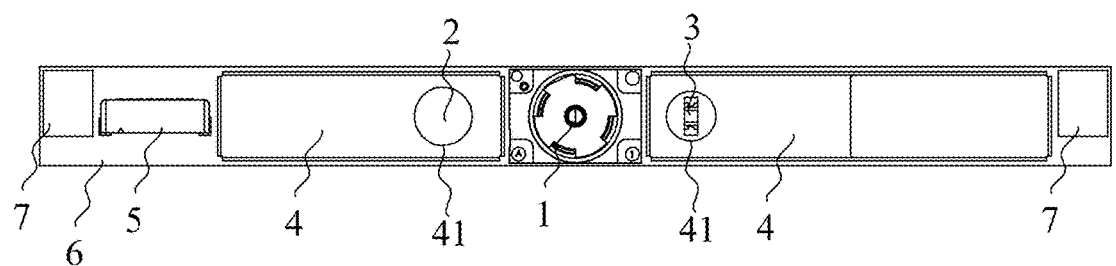
FIG. 1 is a schematic view of a camera module in accordance with an embodiment of the present invention.
Figure 2:
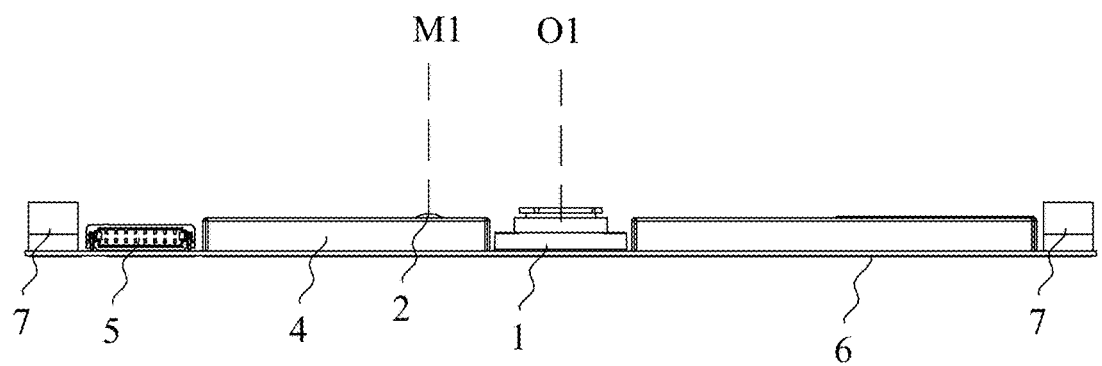
FIG. 2 is a lateral view of the camera module in accordance with the embodiment of the present invention.

With reference to FIG. 1 and FIG. 2, a camera module 10 in accordance with an embodiment of the present invention is shown. The camera module 10 includes a camera 1, a light emitting unit 2, a visible light-emitting diode 3, a housing 4, a connection port 5, a circuit board 6 and at least one acoustic receiver unit 7.

The camera 1 is an infrared camera and the light emitting unit 2 is an infrared light-emitting diode. The infrared camera 1 is electrically connected to the circuit board 6 which is a strip shaped. The infrared camera 1 is arranged between the infrared light-emitting diode 2 and the visible light-emitting diode 3. The housing 4 is separated by the infrared camera 1 into two parts which are adjacent to two sides of the infrared camera 1, one part of the housing 4 accommodates the infrared light-emitting diode 2 and the other part of the housing 4 accommodates the visible light-emitting diode 3. The light-emitting diode 2 is arranged between the connection port 5 and the infrared camera 1. Two end sides of the circuit board 6 arrange two acoustic receiver units 7.

In the embodiment of the present invention, the infrared camera 1 has an optical axis O1, the infrared camera 1 is capable of receiving an infrared light signal having the wavelength of 850 nm. The infrared camera 1 captures the reflected infrared light signals from an object (not shown) and then an image sensor (not shown) converts the light signals into electrical signals, and then the electrical signals are transmitted to the circuit board 6 for further processes.

The infrared light-emitting diode 2 has an optical axis M1. The infrared light-emitting diode 2 is electrically connected to the circuit board 6. The infrared light-emitting diode 2 emits infrared lights having wavelength of 850 nm, and the infrared light-emitting diode 2 has a characteristic of a batwing-shaped luminous intensity distribution. There are two peaks with maximum luminous intensity in the luminous intensity distribution of the infrared light from the infrared light-emitting diode 2. In order to achieve the uniform luminous intensity, the optical axis O1 of the infrared camera 1 and one of the peaks are overlapped, and the peaks of the luminous intensity distribution are respectively positioned at positions deviating about 25 to 35 degrees from the optical axis M1 of the infrared light-emitting diode 2. The infrared light-emitting diode 2 emits infrared light to the object, and then the infrared camera 1 receives the reflected infrared light.

In the embodiment of the present invention, the visible light-emitting diode 3 is selected from a white light-emitting diode and electrically connects to the circuit board 6. When the infrared light-emitting diode 2 is activated, the visible light-emitting diode 3 emits visible white light for informing an user under operating.

The housing 4 is a hollow metal shell for protecting the infrared light-emitting diode 2, the visible light-emitting diode 3 and some electrical components (not shown), such as a wiring layer (not shown), disposed on the circuit board 6. The housing 4 is separated by the infrared camera 1 into two parts which are adjacent to two sides of the infrared camera 1, respectively. Each of the two parts includes a light hole 41 on an upper side of the housing 4, wherein the light holes 41 are respectively corresponding to the infrared light-emitting diode 2 and the visible light-emitting diode 3 for emitting light therethrough.

The connection port 5 and the acoustic receiver units 7 are electrically connected to the circuit board 6. The camera module 10 connects to other devices by the connection port 5, in the embodiment of present invention, the connection port 5 is connected to a processor.

Figure 3:
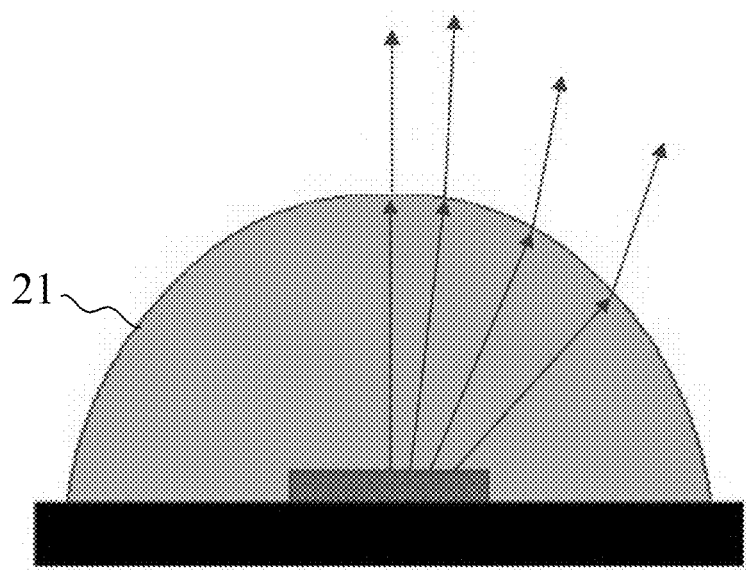
FIG. 3 is a sectional view of a conventional infrared emitting diode.
Figure 4:
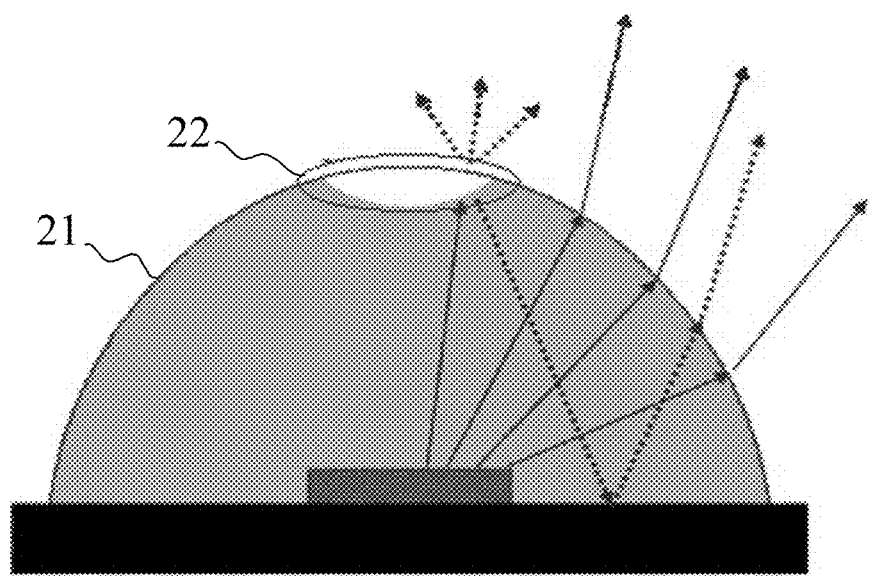
FIG. 4 is a sectional view of a light emitting unit in accordance with the embodiment of the present invention.

Please referring to FIG. 3 and FIG. 4, FIG. 3 is a sectional view of a conventional infrared emitting diode and FIG. 4 is a sectional view of the light emitting unit 2 in accordance with the embodiment of the present invention. The conventional infrared emitting diode is designed by a first-order optics system. Therefore, it requires an additional optical lens (not shown) to carry out a second-order optical design in order to change an angle of light beam from the conventional infrared emitting diode and the luminous intensity distribution. However, the additional optical lens is not fit for the miniaturization design.

The camera module 10 of the embodiment has an improved first-order optical design of the infrared light-emitting diode 2 to change an angle of light beam and the luminous intensity distribution. A top portion of the lens 21 of the infrared light-emitting diode 2 is integrally formed a diffusion region 22 which is corresponding to the optical axis M1. The diffusion region 22 causes the reflection or refraction of the infrared light. As a result, the infrared lights is prevented from being focused on the optical axis M1 and is distributed more uniform than conventional infrared emitting diode. Therefore, the batwing-shaped of the luminous intensity distribution is formed. As described above, the diffusion region 22 not only avoids additional lens, but also achieves the uniform light.

Figure 5:
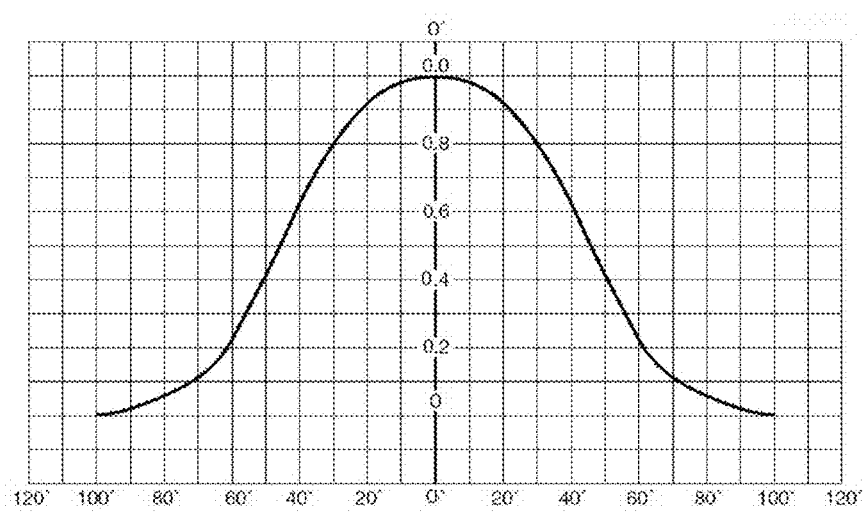
FIG. 5 is a schematic illustration of luminous intensity distribution of the conventional infrared emitting diode.
Figure 6:
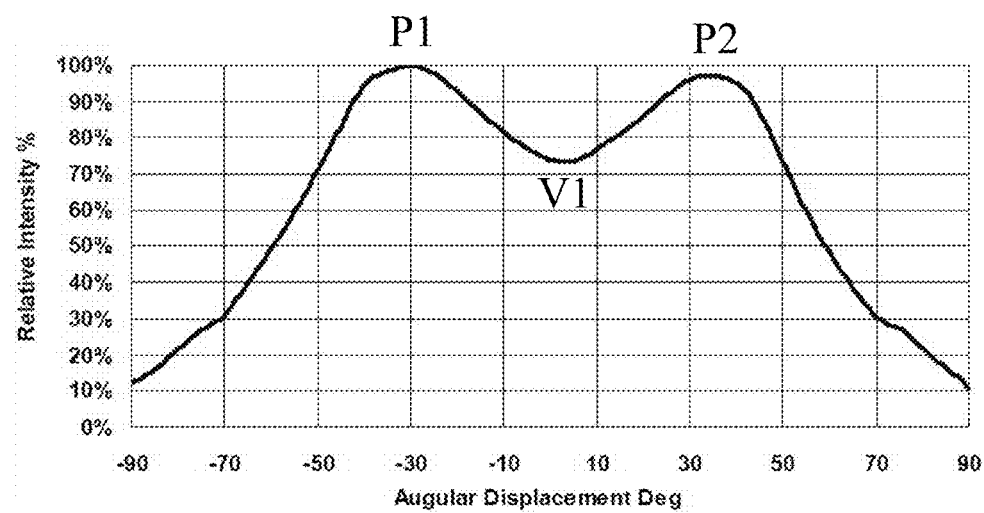
FIG. 6 is a schematic illustration of luminous intensity distribution of the emitting light unit in accordance with the embodiment of the present invention.

Please referring to FIG. 5 and FIG. 6, which show luminous intensity distribution, the vertical axis represents the relative luminous intensity, and the horizontal axis represents the angle of light beam. As shown in FIG. 5, the luminous intensity of the conventional infrared emitting diode higher than 50% is about −45 degree to 45 degree. As shown in FIG. 6, the luminous intensity of the light emitting unit 2 higher than 50% is about −60 degree to 60 degree. Therefore, the distribution of the light beam from the conventional infrared emitting diode is not uniform. If the conventional infrared emitting diode is applied to the face recognition system, the problems described above occur.

However, the infrared light-emitting diode 2 in accordance with the embodiment of the present invention has the batwing-shaped of the luminous intensity distribution. The characteristics of the batwing-shaped luminous intensity distribution is that the luminous intensity at a significant angle relative to the optical axis M1 is greater than the luminous intensity at the optical axis M1. In addition, the batwing-shaped luminous intensity distribution has two maximum luminous intensities positioned at two peaks P1, P2, wherein the batwing-shaped of the luminous intensity distribution has a valley V1 between the peaks P1, P2. The luminous intensity of the valley V1 is lower than the luminous intensity of the peaks P1, P2. In the embodiment, the valley V1 is exactly located in the direction of the optical axis M1 of the infrared light-emitting diode 2.

In further detail, please referring to the FIG. 6, in a range of the angles about from −90 degree to −30 degree (the position of the first peak P1), the relative intensity gradually increases from 10% to 100%. The relative intensity gradually decreases from 100% to about 75% in a range of angles about from −30 degree to 0 degree (the position of the valley V1). The relative intensity gradually increases from about 75% to 100% in a range of angles from 0 degree to 30 degree (the position of the second peak P2). In a range of angles from 30 degree to 90 degree, the relative intensity gradually decreases from 100% to 10%. Therefore, the luminous intensity distribution of the batwing-shaped of the infrared light-emitting diode 2 is more uniform than and the luminous intensity distribution of the conventional infrared light-emitting diode. In addition, the two peaks P1, P2 of the batwing-shaped luminous intensity distribution are respectively positioned at positions deviating about 25 to 35 degrees from the optical axis M1.

Figure 7:
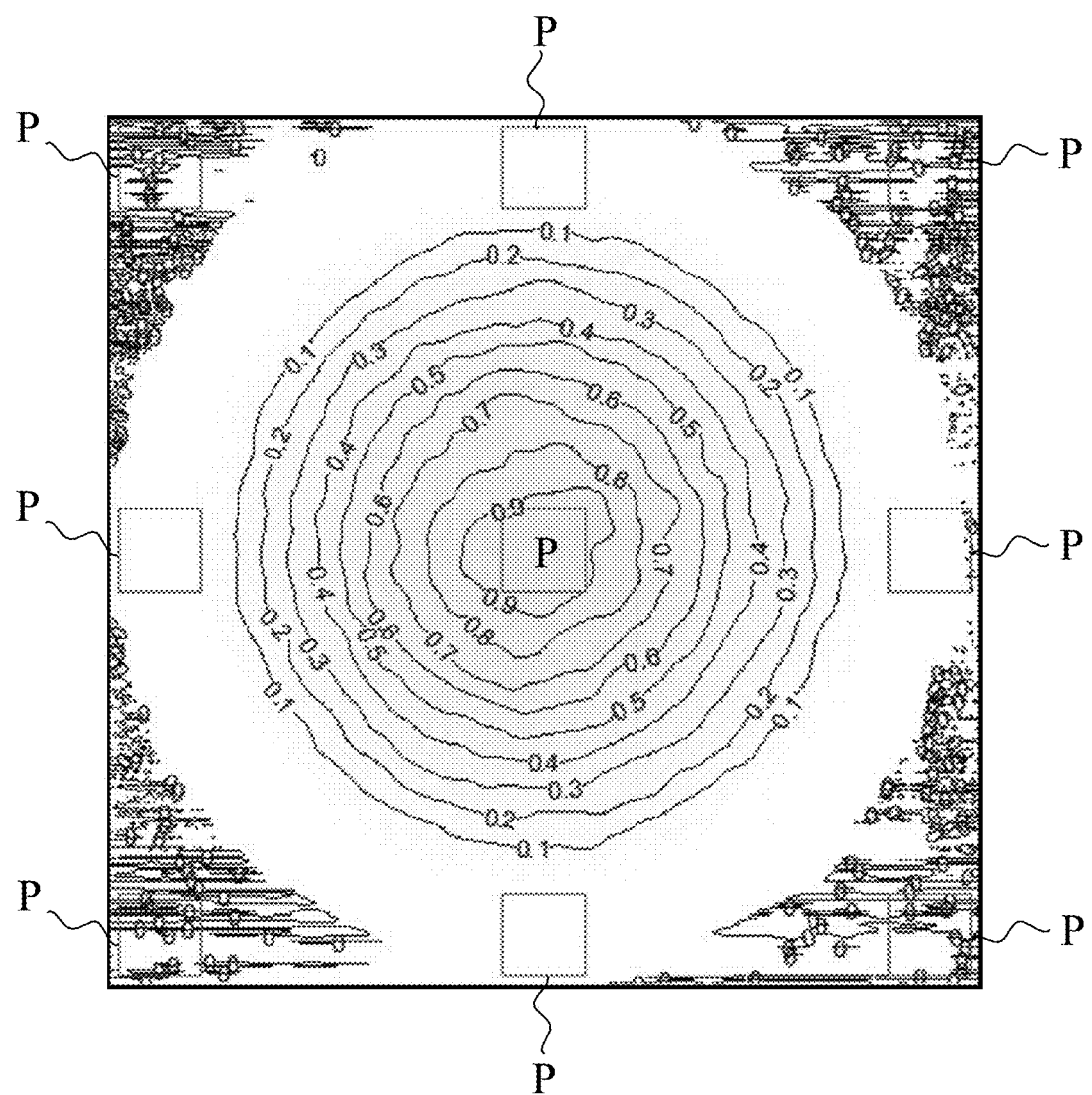
FIG. 7 illustrates an image analytical result by software, when using the conventional infrared emitting diode as a light source.
Figure 8:
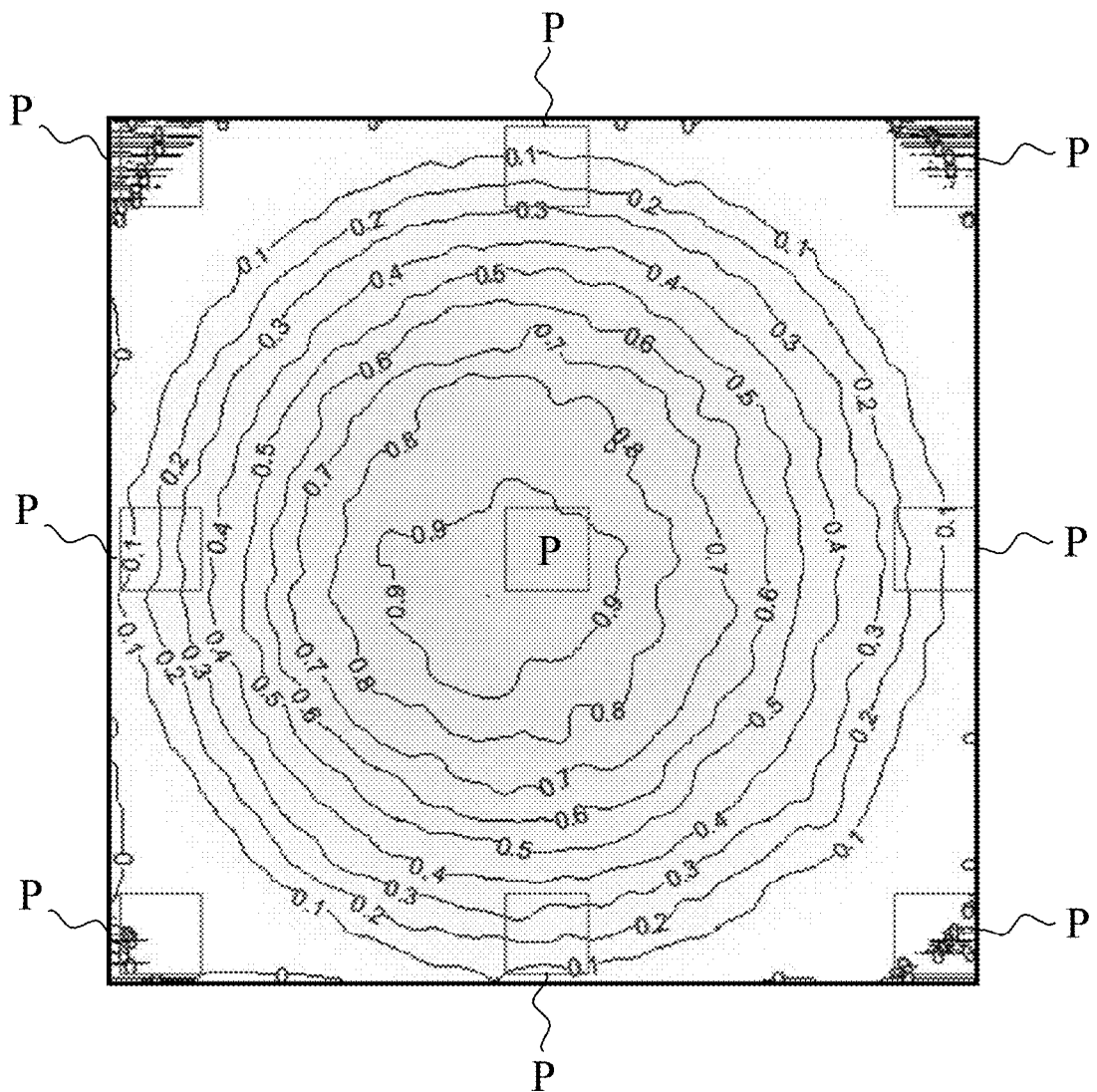
FIG. 8 illustrates an image analytical result by software, when using the light emitting unit of the camera module in accordance with the embodiment of the present invention as a light source.

Please referring to FIG. 7 and FIG. 8, FIG. 7 and FIG. 8 illustrate image analytical results by software, respectively. The tests are carried out under a dark room, and each of the tested objects has a distance about 75 cm from a camera, the testing objects are all 18% of the grayscale image. The experiment steps are described below, first, both infrared emitting diodes emit the infrared light to the respective testing objects; second, both infrared cameras capture the respective reflected infrared light, finally, use the image analysis software Imatest for analyzing the respective captured images.

The image analysis software Imatest focuses on analyzing the intensity of the luminous flux of the reflected infrared light, and normalizing the luminous intensity, the maximum intensity is defined as 1.0. Moreover, there are 9 positions P used as reference for easy to be compared in the various control groups. Both FIG. 7 and FIG. 8 have a maximum luminous intensity in the central position P, and outward gradually decrease luminous intensity to form uniform light. It is clearly determined from FIG. 7 and FIG. 8 that FIG. 8 has the more uniform light than FIG. 7. Comparing with two results in the left-center position P and the right-center position P, the light of FIG. 8 has more obvious diffusion than the light of FIG. 7, moreover, the luminous intensity range of the central position P of FIG. 8 is wider than the luminous intensity range of the central position P of FIG. 7. As described above, the luminous flux of FIG. 8 is not concentrated in the central position P and the luminous intensity distribution of FIG. 8 is more uniform.

As described above, the purpose of the present invention is to solve the problem that the captured image and the object are different because of the non-uniform light. In order to solve the problem, the present invention designs the camera module 10 which includes the infrared light-emitting diode 2 with a batwing-shaped luminous intensity distribution, wherein the optical axis O1 of the infrared camera 1 is arranged between the two peaks P1, P2 of the batwing-shaped luminous intensity distribution of the infrared light-emitting diode 2, and it is found that the camera module 10 will have the best effect when the two peaks P1, P2 are respectively positioned at the positions deviating about 25 to 35 degrees from the optical axis M1 of the infrared light-emitting diode 2. In the embodiment, the optical axis O1 of the infrared camera 1 and one of the peaks P1, P2 are overlapped. The best effect above described means that the above angle range of the luminous intensity distribution is found most suitable for image processing, and the light beam has the uniform distribution characteristic of the luminous intensity. Therefore, it is capable of enhancing authenticity of the image and increasing the reliability of the recognition system.

What is claimed is:

1. A camera module, comprising:
a circuit board;
a camera mounted on the circuit board and having an optical axis; and
a light emitting unit disposed on the circuit board and having an optical axis, a light beam from the light emitting unit forming a batwing-shaped luminous intensity distribution which has at least two peaks of maximum luminous intensity at positions deviating about 25 degrees to 35 degrees from the optical axis of the light emitting unit;
wherein the light emitting unit is selected from a first-order optics system, the light emitting unit comprises a lens and a diffusion region, the diffusion region is corresponding to the optical axis of the light emitting unit, and the optical axis of the camera is arranged at a position between the at least two peaks of the batwing-shaped luminous intensity distribution.

2. The camera module as claimed in claim 1, wherein the optical axis of the camera is overlapped with one of the at least two peaks of the batwing-shaped luminous intensity distribution.

3. The camera module as claimed in claim 1, wherein the diffusion region and the lens are formed integrally.

4. The camera module as claimed in claim 3, wherein the camera is an infrared camera, and the light emitting unit is an infrared light-emitting diode.

5. The camera module as claimed in claim 4, wherein a wavelength of the infrared light-emitting diode is about 850 nm.

6. The camera module as claimed in claim 1, further comprising a visible light-emitting diode, the visible light-emitting diode is disposed on the circuit board, and the camera is arranged between the visible light-emitting diode and the light emitting unit.

7. The camera module as claimed in claim 6, wherein the light emitting unit and the visible light-emitting diode are accommodated in a housing respectively, and the housing comprises two light holes corresponding to positions of the visible light-emitting diode and the light emitting unit respectively.

8. The camera module as claimed in claim 7, wherein the housing is divided into two parts by the camera, the two parts respectively receive the light emitting unit and the visible light-emitting diode, and each of the two parts has one of the two light holes.

9. The camera module as claimed in claim 8, wherein the circuit board is a strip shape.

10. The camera module as claimed in claim 9, further comprising a connection port mounted on the circuit board, which is arranged beside the housing.

11. The camera module as claimed in claim 10, further comprising an acoustic receiver unit mounted on the circuit board, which is arranged beside the connection port, and the connection port is arranged between the housing and the acoustic receiver unit.

12. The camera module as claimed in claimed 11, wherein two ends of the circuit board each are respectively arranged with an acoustic receiver unit.

* * * * *